(12) United States Patent
Rylander (10) Patent No.: US 10,019,012 B2
(45) Date of Patent: Jul. 10, 2018

(54) SYSTEM FOR CALCULATING DESIRED ESTIMATED TIME OF ARRIVAL

(71) Applicant: VOLVO CONSTRUCTION EQUIPMENT AB, Eskilstuna (SE)

(72) Inventor: David Rylander, Sätila (SE)

(73) Assignee: Volvo Construction Equipment AB, Eskilstuna (SE)

( * ) Notice: Subject to any disclaimer, the term of this patent is extended or adjusted under 35 U.S.C. 154(b) by 92 days.

(21) Appl. No.: 15/028,049

(22) PCT Filed: Oct. 29, 2013

(86) PCT No.: PCT/SE2013/000165
§ 371 (c)(1),
(2) Date: Apr. 8, 2016

(87) PCT Pub. No.: WO2015/065251
PCT Pub. Date: May 7, 2015

(65) Prior Publication Data
US 2016/0239023 A1    Aug. 18, 2016

(51) Int. Cl.
*G05D 1/02* (2006.01)
*G01C 21/34* (2006.01)
*G01S 19/42* (2010.01)

(52) U.S. Cl.
CPC ........... *G05D 1/0223* (2013.01); *G01C 21/34* (2013.01); *G01S 19/42* (2013.01); *G05D 1/0291* (2013.01); *G05D 2201/0202* (2013.01)

(58) Field of Classification Search
CPC .................................................. G05D 1/0223
See application file for complete search history.

(56) References Cited

U.S. PATENT DOCUMENTS 4,630,227 A    12/1986  Hagenbuch
5,644,489 A *  7/1997  Hagenbuch ............ G01G 19/08
                                                   177/139

(Continued)

FOREIGN PATENT DOCUMENTS

JP    2013200158 A    10/2013
WO       9837468 A1    8/1998
WO    2013165298 A1   11/2013

OTHER PUBLICATIONS

European Official Action (dated Jul. 20, 2017) for corresponding European App. EP13896219.

(Continued)

*Primary Examiner* — Adam D Tissot
*Assistant Examiner* — Michael A Berns
(74) *Attorney, Agent, or Firm* — WRB-IP LLP (57) ABSTRACT

A system for calculating a desired time of arrival to a target destination for a vehicle includes a device mountable to a first vehicle. The device includes a transmitter, a receiver, and a logic unit configured to receive signals for determining a current position and a current vehicle speed of the first vehicle, the logic unit being further configured to determine an estimated time of arrival at a target destination for the first vehicle based on predetermined route information, the current position of the first vehicle and the target destination of the first vehicle. The device is configured to transmit the estimated time of arrival at the target destination for the first vehicle, receive, from a second vehicle, an estimated time of arrival at the target destination for the second vehicle, calculate a desired estimated time of arrival at the target destination for the first vehicle based on the received estimated time of arrival at the target destination for the second vehicle, and calculate a desired vehicle speed for the first (Continued)

vehicle for achieving the desired estimated time of arrival at the target destination for the first vehicle.

20 Claims, 6 Drawing Sheets

(56) References Cited

U.S. PATENT DOCUMENTS

| | | | |
|---|---|---|---|
| 5,646,344 | A | 7/1997 | Gudat et al. |
| 5,931,875 | A | 8/1999 | Kemner et al. |
| 6,484,078 | B1 * | 11/2002 | Kageyama ............ G05D 1/0297 |
| | | | 340/989 |
| 9,052,209 | B2 * | 6/2015 | Jericho .................. G07C 5/008 |
| 2001/0044697 | A1 | 11/2001 | Kageyama |
| 2012/0323474 | A1 | 12/2012 | Breed et al. |
| 2013/0323474 | A1 | 10/2014 | Brodney et al. |

OTHER PUBLICATIONS

International Search Report (dated Jul. 7, 2014) for corresponding Intenrational App. PCT/SE2013/000165.
International Preliminary Report on Patentability (dated Feb. 11, 2016) for corresponding International App. PCT/SE2013/000165.

* cited by examiner

SYSTEM FOR CALCULATING DESIRED ESTIMATED TIME OF ARRIVAL

BACKGROUND AND SUMMARY

The present invention relates to a system for calculating a desired time of arrival to a target destination for a vehicle. The invention is applicable on vehicles, for example working machines within the fields of industrial construction machines and in particular articulated haulers. Although the invention will be described with respect to an articulated hauler, the invention is not restricted to this particular machine, but may also be used in other construction equipment or in other vehicles, such as wheel loaders, trucks, etc.

In connection with transportation of e.g. loads at construction site or the like, working machines in the form of articulated haulers, wheel loaders, trucks or dumpers are frequently used. In its simplest configuration, the machines are arranged to load a platform of the vehicle, or a container or the like arranged on the platform of the vehicle, at a loading position of the construction site and drive to an unloading position of the construction site, located at a distance from the loading position, where it unloads the platform of the vehicle. At the unloading position, the loads are often taken care of in one way or the other. For example, at a quarry plant, large stone material is often freighted to an unloading position having a crusher for handling the load received from the working machines.

A prerequisite for efficiently handling a quarrying plant is that the crusher is continuous provided with loads from the working machines, i.e. it should preferably at no times be left without load to handle.

A problem often arising at, for example, the above described quarry plant is that the working machines have to stand in line before being able to unload their vehicle platform. The same naturally applies at the loading position where the working machines have to stand in line before being able to load their vehicle platform. Accordingly, the machine utilization at construction sites is in need of improvements such that the machines arrive at e.g. loading positions and/or unloading positions in such a way as to minimize their waiting time at the respective loading and unloading position.

U.S. Pat. No. 6,484,078 disclose a vehicle travel route control system. The system is configured to improve working efficiency of vehicles by enabling prompt change of travel route at a time when it becomes necessary to change the travel route of the vehicle.

Although U.S. Pat. No. 6,484,078 presents a solution for how to improve working efficiency at a worksite by arranging, the vehicles to arrive at the worksite at an optimum time level. U.S. Pat. No. 6,484,078 is still in need of further improvements in terms of e.g. cost and simplified functionality.

It is desirable to provide a system having improved functionalities for calculating estimated time of arrival at a target destination.

According to a first aspect of the present invention there is provided a system for calculating a desired time of arrival to a target destination for a vehicle, comprising a device mountable to a first vehicle, the device comprises a transmitter; a receiver; and a logic unit configured to receive signals for determining a current position and a current vehicle speed of the first vehicle, the logic, unit being further configured to determine an estimated time of arrival at a target destination for the first vehicle based on predetermined route information, the current position of the first vehicle and the target destination of the first vehicle; wherein the device is configured to transmit the estimated time of arrival at the target destination for the first vehicle; receive, from a second vehicle, an estimated time of arrival at the target destination for the second vehicle; calculate a desired estimated time of arrival at the target destination for the first vehicle based on the received, estimated time of arrival at the target destination for the second vehicle; and calculate a desired vehicle speed for the first vehicle fix achieving the desired estimated time of arrival at the target destination for the first vehicle.

The wording "transmit the estimated time of arrival" should in the following and throughout the description be interpreted as transmitting a signal to the environment of the vehicle provided with the device. The device is hence configured to transmit a signal which can be received by any other vehicle in the surrounding of the vehicle transmitting the signal. More specifically, a receiver of a respective vehicle can receive the transmitted signal. The transmitted estimated time of arrival may thus not be directed to any specific, or prearranged, receiver. For example, at a construction site, the transmitted signal may be transmitted to vehicles located at a predetermined radius from the vehicle transmitting the signal, or to all vehicles at the construction site that are able to receive the signal.

Furthermore, the wording "predetermined route information" should be interpreted as information regarding the route the vehicle is intended to drive. This information can be provided by means of, for example, a global positioning unit, a pre-programmed map, etc. By means of the predetermined route information, the travel time to the target destination for the vehicle can be determined since it is to be understood that the predetermined route information also has access to information relating to the speed limitations along the route. These speed limitations may be determined by means of, for example, receiving information from other vehicles that have previously been driving on the specific route, the previous speed which the specific vehicle had when previously driving on the route, as well as the above described global positioning unit or pre-programmed map, etc.

The present invention is based on the insight that by arranging a vehicle to transmit and receive an estimated time of arrival at a target destination, a relatively cost efficient system can be provided. The system of the present invention is hence not in need of any hierarchic higher system or control unit. Accordingly, the present invention is related to a distributed system were "communication" is provided at the same hierarchic level. In detail, the system of the present invention is not in need of and does not utilize, e.g. a supervising control unit or system, which makes the system relatively cost efficient and can be used, for example, at smaller working sites, etc.

An advantage of the present invention is that vehicles are aware of each other at, for example, the construction site. This means that the vehicles communicate with each other in such a way that each vehicle, or the device arranged in each vehicle, receives an estimated time of arrival at a target destination for a second vehicle at the site. The vehicle, here the first vehicle, receiving the estimated time of arrival can thereafter adapt to the information from the second vehicle calculating a desired estimated time of arrival at the target destination in relation to the estimated time of arrival at the target destination for the second vehicle. The first vehicle may then, based on the received estimated time of arrival for the second vehicle and the determined estimated time of arrival of the first vehicle, increase or decrease its vehicle speed to arrive at the target destination at a desired point in time. Hereby, the fuel consumption of the first vehicle can be reduced or the working efficiency of e.g. a crusher at the construction site can be increased.

According to an example embodiment, the device may be further configured to receive an estimated time of arrival at the target destination for a third vehicle; calculate a desired estimated time of arrival at the target destination for the first vehicle based on the received estimated time of arrival at the target destination for the third vehicle; and calculate a desired vehicle speed for the first vehicle for achieving the desired estimated time of arrival at the target destination for the first vehicle only if the estimated time of arrival at the target destination for the third vehicle is later than the estimated time of arrival at the target destination for the second vehicle.

Hereby, the system may be further arranged to disregard information from all vehicles other than the vehicle closest ahead of the first vehicle. More specifically, the system may receive the estimated time of arrival for all vehicles transmitting their estimated time of arrival but may be arranged to only calculate a desired estimated time of arrival and a desired vehicle speed if the received estimated time of arrival is transmitted from the vehicle next ahead of the first vehicle. An advantage is that the demands on the system performance, such as speed of performing calculations, can be reduced, which enables for the use of e.g. cheaper system components. Also, by only regarding one vehicle when calculating a desired vehicle speed may simplify for e.g. a driver of the vehicle, which does not have to consider more than one vehicle when provided with the calculated vehicle speed. The communication of the desired vehicle speed to the driver of the vehicle will be explained further below.

According to an example embodiment, the device may be further configured to receive an estimated time of arrival at a second target destination for a third vehicle; and calculate a desired estimated time of arrival at the second target destination for the first vehicle based on the received estimated time of arrival at the second target destination for the third vehicle only if the second target destination is the same target destination as the target destination.

An advantage is that the device may disregard received estimated time of arrival from vehicles which are headed towards another target destination in relation to the target destination of the first vehicle. The device may hence also receive information regarding route information or target destination for the other vehicles and filter out the estimated time of arrival for vehicles having other target destination than the target destination of the present vehicle.

According to an example embodiment, the target destination may be a first target destination, wherein the device may be further configured to determine an estimated time of arrival at a second target destination for the first vehicle, and select that a next desired target destination for the first vehicle is the first target destination if the determined estimated time of arrival at the first target destination is earlier in time than the determined estimated time of arrival at the second target destination.

Hereby, the system is always aware of the next target destination. This information may also be transmitted, together with the estimated time of arrival, to the other vehicles at e.g. the construction site.

According to an example embodiment, the device may be further configured to receive signals, from weight sensors of the vehicle, indicative of a current weight of a load on a platform of the vehicle; and select that a next desired target destination for the first vehicle is a second target destination if the weight of the load on the platform of the first vehicle is above a predetermined weight value.

The weight sensors may provide for further information regarding the next target destination of the vehicle. This may especially be adapted in cases where the vehicle is e.g. a dumper or an articulated hauler at a construction site driving from a loading position, i.e. the target destination, to an unloading position, i.e. the second target destination, and vice versa.

Hereby, the platform of the vehicle may be empty of load, i.e. no load is provided in e.g. a container arranged on the platform, when driving from the unloading position to the loading position, and be provided with a load, i.e. not empty, when driving from the loading position to the unloading position. The platform should be interpreted as a part of the vehicle being able to receive e.g. a container of the vehicle in cases when the vehicle is an articulated hauler or other working machine having a specific container for transportation of loads. The predetermined weight value may be a calibrated value of the weight of e.g. the container arranged on the platform when the container is empty of load, which may have been measured when e.g. the vehicle has left the unloading position.

According to an example embodiment, the device may be further configured to determine an estimated time of arrival at a second target destination for the first vehicle; and select that a desired target destination for the first vehicle is the second target destination if a time difference between the estimated time of arrival at a first target destination for the first vehicle and the estimated time of arrival at the first target destination for the second vehicle is below a predetermined time period.

If it is determined that the first vehicle will arrive at the target destination to close in time in relation to the vehicle ahead, the system may select that the first vehicle should instead drive to a second target destination where it may not have to stand in line and wait for other vehicles. For example, the first vehicle may have calculated a desired vehicle speed based on an estimated time of arrival at a target destination for the second vehicle ahead of the first vehicle. If then, for example, a third vehicle suddenly overtakes the first vehicle; the first vehicle may be directed to a second target destination instead of adapting its desired vehicle speed in relation to the vehicle it was just being overtaken by. This naturally assumes that there is a second target destination available. If not, then the first vehicle either have to adapt its speed to the third vehicle it was overtaken by, as described above, or accept that it have to stand in line and wait at the first target destination.

According to another example, the system may determine that the vehicle should be directed to the second target destination despite the fact that the travel time to the second target destination is more time consuming than the travel time to the first target destination, but the waiting time at the second target may be such that the overall time consumption is improved by choosing the second target destination.

According to an example embodiment, the target destination may be selected based on said route information and said current position.

According to an example embodiment, the device may be further configured to receive signals indicative of a weight of a load on a platform of the respective first and the second vehicle; and calculate a desired estimated time of arrival at the target destination for the first vehicle based on the received estimated time of arrival at the target destination for the second vehicle and a weight ratio between the weight of the load on the platform of the first vehicle and the weight of the load on the platform of the second vehicle.

According to an example embodiment, the device may be further configured to receive a signal indicative of a current vehicle speed of the first vehicle receive a signal indicative of a current vehicle speed of the second vehicle; and calculate a desired estimated time of arrival at the target destination for the first vehicle based on the received estimated time of arrival at the target destination for the second vehicle and a vehicle speed ratio between the vehicle speed of the first vehicle and the vehicle speed of the second vehicle.

Hereby, if the target destination is, for example, a bottle neck of a road where the first and the second vehicle may not be able to pass at the same time, i.e. they may not be able to meet at this bottle neck. The device may then be configured to select which one of the vehicles that should pass the bottle neck first, in dependence of the respective estimated time of arrival and the weight of a load on the respective platform and/or the respective vehicle speed of the vehicles. Hereby, rules may be provided that can establish which one of the vehicles that should pass the bottle neck first. For example, it may be determined that the vehicle provided with a load, i.e. the vehicle which signal indicates that the platform is provided with a load, should keep its current vehicle speed and pass the bottle neck first since this will be more efficient in regards to fuel consumption than having to reduce the vehicle speed of the vehicle provided with a load on the platform. Also, the system may select that the vehicle which will increase its fuel consumption the most by reducing: its speed should keep its current speed and be prioritized. Other parameters for prioritizing which vehicle should pass the bottle neck first are of course conceivable. For example, a vehicle going uphill may have priority over a vehicle going downhill, vehicles in most need of arriving at a target destination at a specific time i.e. that will affect the productivity the most if arriving late to its target destination, may also be prioritized.

According to an example embodiment, the device may be further configured to transmit a signal to a display unit arranged within a compartment of the first vehicle, wherein the signal is indicative of the calculated vehicle speed of the first vehicle.

Hereby, the driver of the vehicle can be provided with the information relating to the calculated vehicle speed and manually adapt the vehicle to drive at that speed in order to arrive at the target destination at the desired point in time.

According to an example embodiment, the device may be further configured to transmit a signal to a driveline of the first vehicle, wherein the signal is indicative of the calculated vehicle speed of the first vehicle for controlling the speed of the driveline of the first vehicle.

Hereby, the device can be arranged to control the vehicle by means of controlling the driveline of the vehicle to propel the vehicle at the calculated desired vehicle velocity. The controlling of the driveline may include, for example, to control the revolutions per minute of the engine and/or to control the gearbox to shift gear. As a further example, the device may also be arranged to control the fuel injection of the vehicle engine, etc.

According to an example embodiment, the calculated vehicle speed of the first vehicle may be based on the estimated time of arrival received from the second vehicle and a predetermined time period.

Hereby, not only the estimated time of arrival of the second vehicle is considered when calculating the desired estimated time of arrival and the desired vehicle speed of the first vehicle, but also an additional predetermined time period, which will be described further below.

According to an example embodiment, the predetermined time period may be a part of the time period the second vehicle is expected to be stationary at the target destination.

An advantage is that the device can be provided with further detail when calculating a desired estimated time of arrival for the first vehicle, and hence also when calculating a desired vehicle speed of the first vehicle.

According to an example embodiment, the device may be further configured to receive a signal from the target destination, the signal being indicative of an estimated duration of stay for the second vehicle at the target destination.

This provides for further detail in calculating an estimated time of arrival for the first vehicle. It should however be noted that the signal received from the target destination is being made on the same hierarchical level as the above signal between vehicles.

Furthermore, for the above example of a crusher, the device may also be configured to receive a signal from the crusher, wherein the signal is indicative of the current production rate of the crusher. Hereby, the system may use this information as a further parameter when calculating a desired estimated time of arrival for the first vehicle. For example, if the production rate of the crusher is 10 tonnes per minute and the second vehicle has a load of 10 tonnes to unload, the device of the first vehicle may be configured to receive the signal from the crusher as well as a signal from the second vehicle being indicative of the load on the platform of the second vehicle, and calculate a desired estimated time of arrival at the crusher based on these parameters in order not only have to stand in line at the crusher but also to minimize the risk of letting the crusher being empty of load. Hereby, the production rate of the site may be increased. Further aspects of the crusher may also be included in the calculation, such as buffer possibilities of the crusher etc.

According to an example embodiment, the signals received by the logic unit for determining a current position of the first vehicle may be provided from a global positioning unit. The global positioning unit may be either connected to the logic, unit or form an integral part of the logic unit.

According to an example embodiment, the signals received by the logic unit for determining a current vehicle speed of the first vehicle may be provided from a global positioning unit or a speedometer. The global positioning unit and/or the speedometer may be either connected to the logic unit or form an integral part of the logic unit.

According to a second aspect of the present invention there is provided a system for calculating a desired time of arrival to a target destination for a vehicle, comprising a first and a second device mountable to a respective first and second vehicle, each of the first and the second devices comprising a transmitter; a receiver; and a logic unit configured to receive signals for determining a current position and a current vehicle speed for the respective first and the second vehicle, the logic unit being further configured to determine an estimated time of arrival at a target destination based on predetermined route information, the current position and the target destination for the respective first and second vehicles, wherein the second device is configured to transmit the estimated time of arrival at the target destination for the second vehicle, wherein the first device is configured to receive the transmitted estimated time of arrival at the target destination for the second vehicle and to calculate a desired estimated time of arrival at the target destination for the first vehicle based on the received estimated time of arrival at the target destination for the second vehicle, and to calculate a desired vehicle speed for the first vehicle for achieving the desired estimated time of arrival at the target destination for the first vehicle.

According to an example embodiment, the system may comprise a plurality of devices mountable to respective plurality of vehicles, wherein a first subset of the plurality of vehicles has a first target destination, and a second subset of the plurality of vehicles has a second target destination; wherein each device is configured to calculate a desired vehicle speed only when receiving an estimated time of arrival from a device of a vehicle having the same target destination.

Further effects and features of this second aspect of the present invention are largely analogous to those described above in relation to the first aspect of the present invention.

According to a third aspect of the present invention there is provided a method for calculating a desired time of arrival to a target destination for a first vehicle, the first vehicle comprising, a transmitter, a receiver and a logic unit, the method comprising the steps of determining a current position of the first vehicle; determining an estimated time of arrival at the target destination for the first vehicle based on predetermined route information, the current position of the first vehicle and the target destination; receiving, from a second vehicle, an estimated time of arrival at the target destination for the second vehicle; calculating, by means of the logic unit, a desired estimated time of arrival at the target destination for the first vehicle based on the received estimated time of arrival at the target destination for the second vehicle; and calculating a desired vehicle speed for the first vehicle for achieving the desired estimated time of arrival at the target destination for the first vehicle.

Further effects and features of this third aspect of the present invention are largely analogous to those described above in relation to the first and second aspects of the present invention.

According to a fourth aspect of the present invention there is provided a computer program comprising code means for performing the above described method steps when the program is run on a computer.

According to a fifth aspect of the present invention there is provided a computer readable medium carrying the above described computer program.

Effects and features of the third and fourth aspects of the present invention are largely analogous to those described above in relation to the first, second and third aspects of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional features and advantages of the present invention, will be better understood through the following illustrative and non-limiting detailed description of exemplary embodiments of the present invention, wherein.

DETAILED DESCRIPTION

The present invention will now be described more fully hereinafter with reference to the accompanying drawings, in which exemplary embodiments of the invention are shown. The invention may, however, be embodied in many different forms and should not be construed as limited to the embodiment set forth herein, rather, these embodiments are provided for thoroughness and completeness. Like reference character refer to like elements throughout the description.

Figure 1:
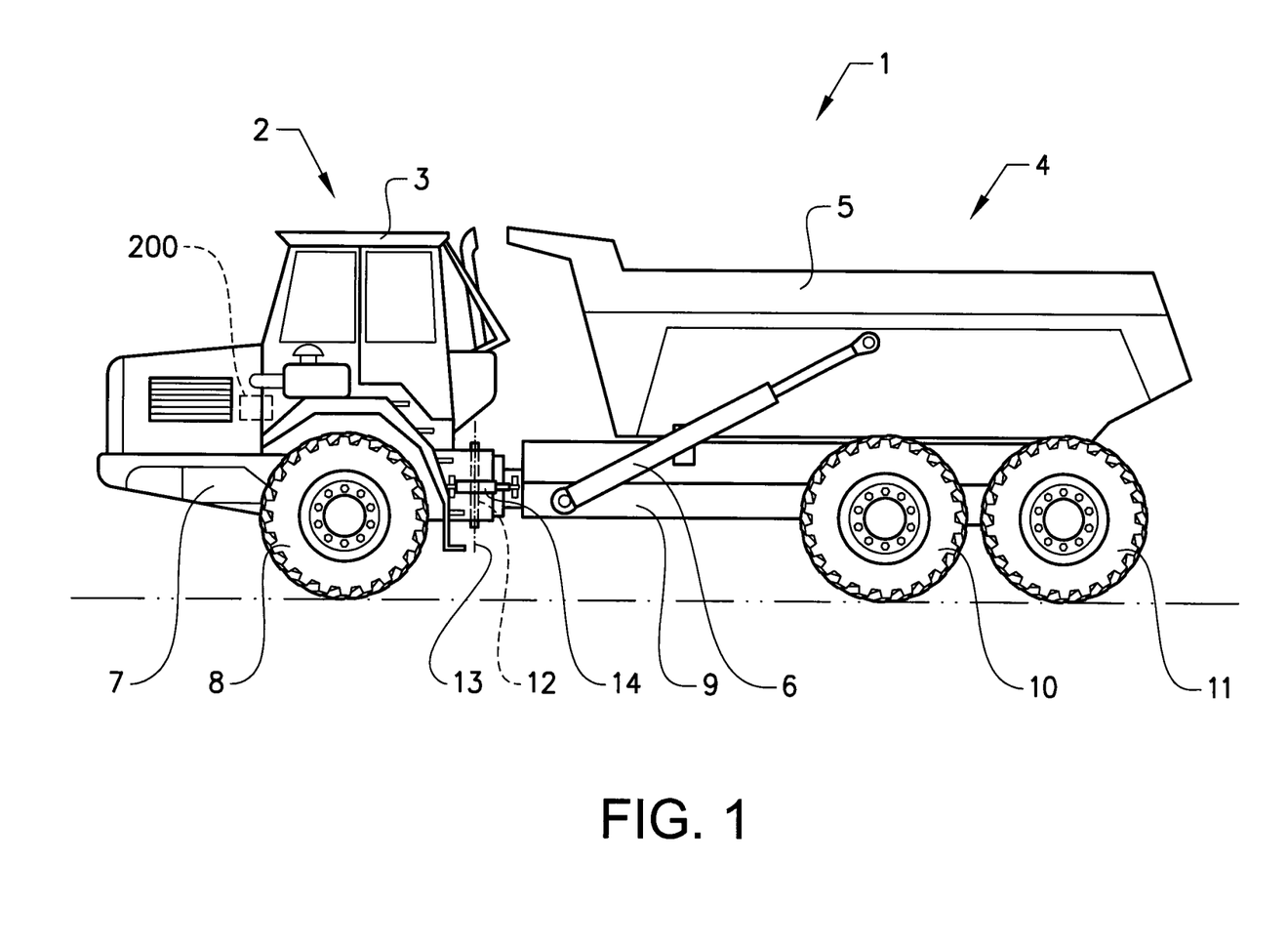
FIG. 1 is a perspective view of a working machine provided with a system according to an example embodiment of the present invention.

FIG. 1 is a perspective view of a working machine 1 in the form of an articulated hauler having a front section 2 with a cab 3 for a driver and a rear section 4 with a platform having a container 5 arranged thereon, for receiving load. The container is preferably pivotally connected to the rear section and tiltable by means of a pair of tilting cylinders 6, for example hydraulic cylinders. The front section has a front frame 7 and a pair of wheels 8 suspended from the front frame 7. The rear section 4 has a rear frame 9 and two pair of wheels 10, 11 suspended from the rear frame 9.

The working machine is frame-steered, i.e. there is a pivot joint 12 connecting the front section 2 and the rear section 4 of the working machine 1. The front section and the rear section are pivotally connected to each other for pivoting around a substantially vertical pivot axis 13.

The working machine preferably comprises a hydraulic system having two hydraulic cylinders 14, steering cylinders, arranged on opposite sides of the working machine for turning the working machine by means of relative movement of the front section 2 and the rear section 4. The hydraulic cylinders can, however, be replaced by any other linear actuator for steering the machine, such as an electromechanical linear actuator.

The working machine can further comprise a second pivot joint connecting the front section and the rear section of the working machine for allowing the front section and the rear section to pivot relative to each other about a substantially horizontal pivot axis extending in the longitudinal direction of the working machine.

Furthermore, the working machine 1 in the illustrated embodiment of FIG. 1 is provided with a system 200 for calculating a desired time of arrival at a target destination for the working machine 1. The system 200 is described in further detail with reference to FIG. 2. The system will firstly be described by means of its components and functionalities in relation to FIG. 2, and thereafter, with reference to FIGS. 3-5, be described in relation to exemplifying driving scenarios at a working site at which the working machine 1 is located. Finally, FIG. 6 will schematically summarize and depict an example embodiment of a method according to the present invention. The present invention should not be construed as limited to the positioning of the system 200 as depicted in FIG. 1, which of course can be positioned elsewhere on the working machine.

Figure 2:
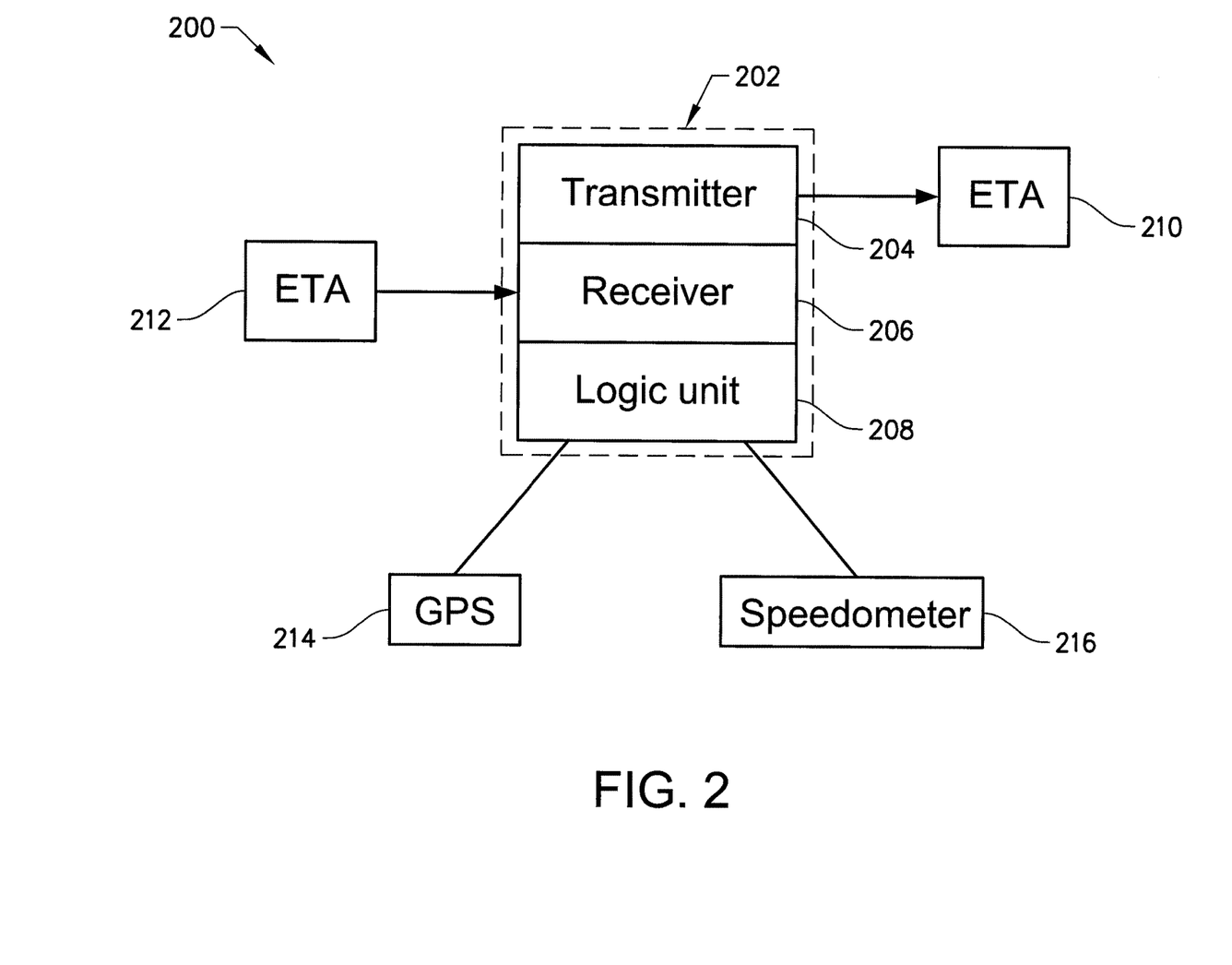
FIG. 2 shows an example embodiment of a system according to the present invention.

Turning now to FIG. 2 which shows an example embodiment of a system according to the present invention.

The system comprises a device 202 which is arranged to be mounted on the vehicle 1 depicted in FIG. 1. The device 202 illustrated in the example embodiment of FIG. 2 comprises a transmitter 204, a receiver 206, and a logic, unit 208. The logic unit 208 is configured to receive signals for determining the position of the vehicle 1 and its vehicle speed. This can be achieved by means of e.g. a global positioning unit (GPS) 214 and a speedometer 216. The GPS 214 and the speedometer 216 are in the example embodiment of FIG. 2 externally coupled to the logic unit 208. The GPS 214 and the speedometer 216 may of course also form an integral part of the logic unit 208. The illustration of separate GPS 214 and speedometer 216 is hence mainly provided for simplified illustrative purposes. Furthermore, the logic unit 208 is also configured to determine an estimated time of arrival 210 at a target destination 304 (FIG. 3) for the vehicle 1 based on the current position of the vehicle 1, in the embodiment of FIG. 2 received from the GPS 214, the target destination, and a predetermined route information. The predetermined route information may for example, be received from the OPS 214 connected to the logic unit 208, or from a pre-programmed map connected to the vehicle. The predetermined route information is hence information relating to the route the vehicle is intended to drive in order to arrive at the desired target destination. The information regarding the estimated time of arrival 210 at the target destination should also be understood to include information regarding which destination the estimated time of arrival relates to. The same applies to the below described estimated time of arrival 212 for other vehicles at the working site. Moreover, the current vehicle speed of the vehicle may as an example also be included as a parameter when determining the estimated time of arrival.

Moreover, the transmitter 204 is configured to transmit the estimated time of arrival 210 at the target destination 304 (FIG. 3) for the vehicle 1 onto which the device is mounted, and the receiver 206 is in turn configured to receive an estimated time of arrival 212 at a target destination for other vehicles at the working site. The transmitter may, for example, be configured to continuously transmit an estimated time of arrival at the target destination with a frequency in the interval between e.g. 0.2 Hz and 5 Hz.

Figure 3:
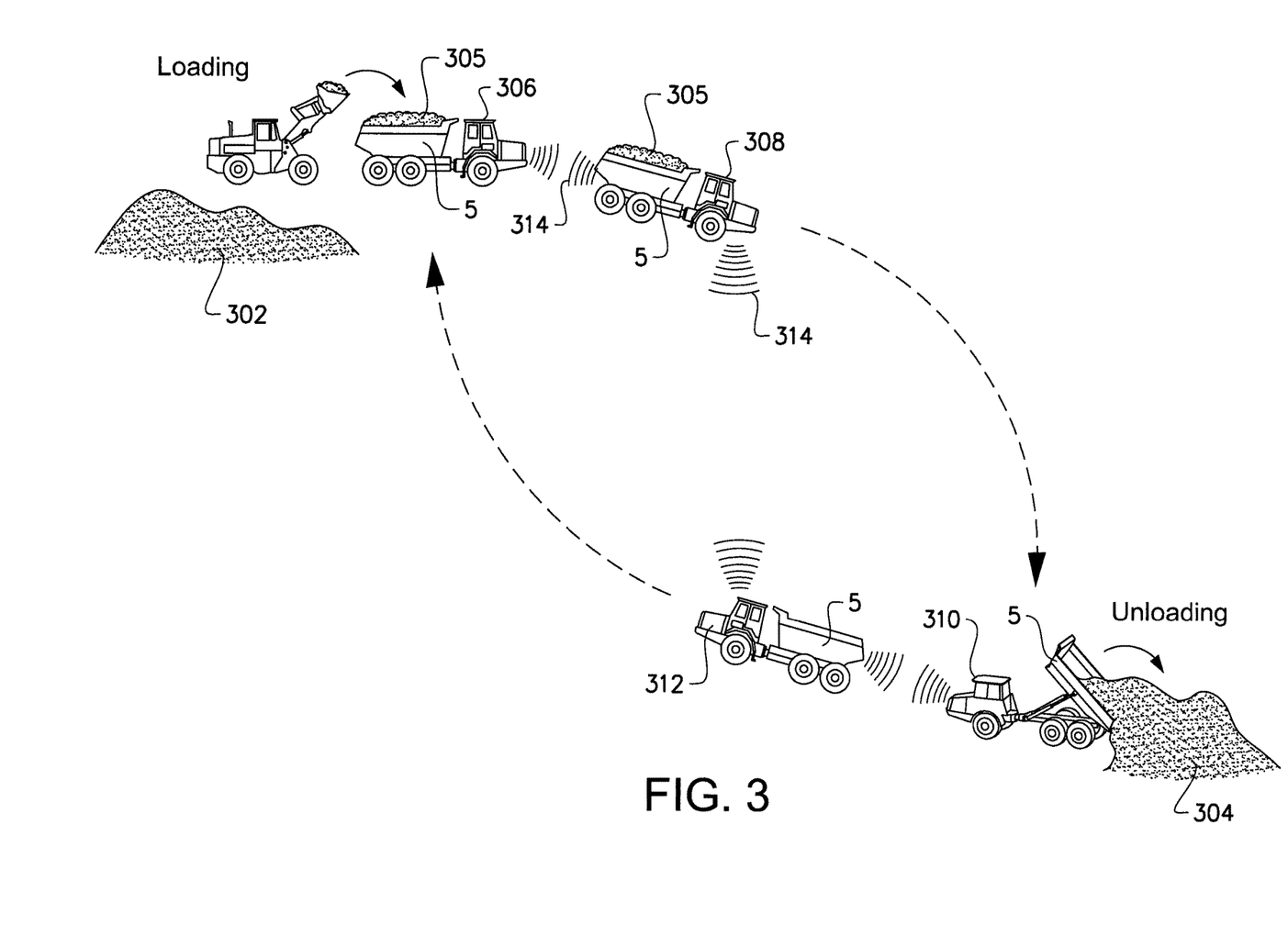
FIG. 3 illustrates an example of a driving scenario at a working site utilizing an example embodiment of a system according to the present invention.

Unless specifically indicated, the target destination for the transmitted estimated time of arrival 210 and for the received estimated time of arrival 212 is the same target destination 304 (FIG. 3).

In more detail, when the device has received, from another vehicle at the working site, an estimated time of arrival 2 2 at the target destination 304 (FIG. 3), the device is configured to calculate a desired estimated time of arrival at the target destination 304 based on the estimated time of arrival 212 at the target destination 304 received by the receiver 206 as described above. Accordingly, based on information at which time the other vehicles at the working site is determined to arrive at the target destination, the device 202 is configured to calculate a desired estimated time of arrival at the target destination 304. This desired estimated time of arrival can thus be chosen such that the vehicle 1 arrives at the target destination at a predetermined time period after the received estimated time of arrival for the other vehicles at the working site. The predetermined time period can be chosen based on e.g. information relating to the specific target destination or statistic Information of previous time periods in which vehicles have been stationary at the target destination. For example, if the target destination is a crusher, the predetermined time period may be the time period from when the vehicle arrives at the crusher until the time period when the crusher is ready to receive new load. This information may be received by the device 202 from the crusher, i.e. the device 202 may receive a signal, from the crusher, indicative of the current time period in which the vehicle ahead is to be stationary at the crusher. The crusher may hence also receive and transmit signals on the same hierarchic level as the vehicles.

Furthermore, when the device 202 has calculated a desired estimated time of arrival 210 at the target destination 304, the device is further configured to calculate a desired vehicle speed for achieving the desired estimated time of arrival 210 at the target destination 304.

Still further, when the device has calculated the desired vehicle speed to arrive at a desired time, this desired vehicle speed can be provided to the driver of the vehicle. This may be achieved by sending signals, indicative of the calculated desired vehicle speed, from the device 202 to e.g. a display unit (not shown) arranged at an instrument panel within the compartment of the vehicle 1, or in the vicinity of the instrument panel within the vehicle 1, such that the driver can adapt the speed of the vehicle accordingly. Other ways of controlling the vehicle speed is of course conceivable. For example, the device may be configured to transmit signals relating to the calculated vehicle speed to e.g. the cruise control of the vehicle such that the cruise control can adaptively, and automatically, control the speed of the vehicle. Also, although the device 202 may calculate the desired vehicle speed continuously, i.e. at a certain frequency interval, it should be noted that the device can be configured to transmit the above described signals to the display unit or to the cruise control with a lower frequency to avoid jerky driving of the vehicle.

Figure 4:
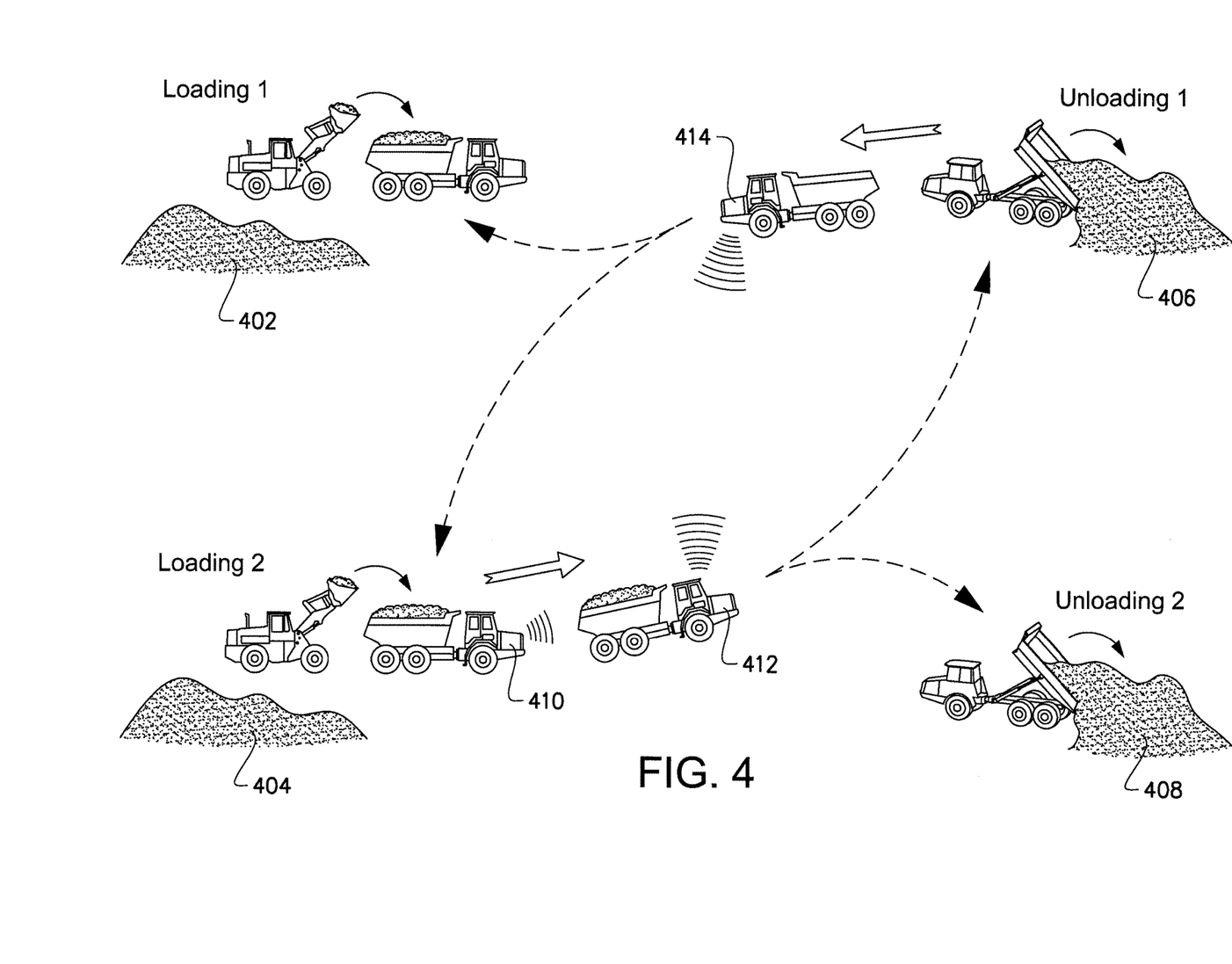
FIG. 4 illustrates a further example of a driving scenario at a working site utilizing an example embodiment of a system according to the present invention.
Figure 5:
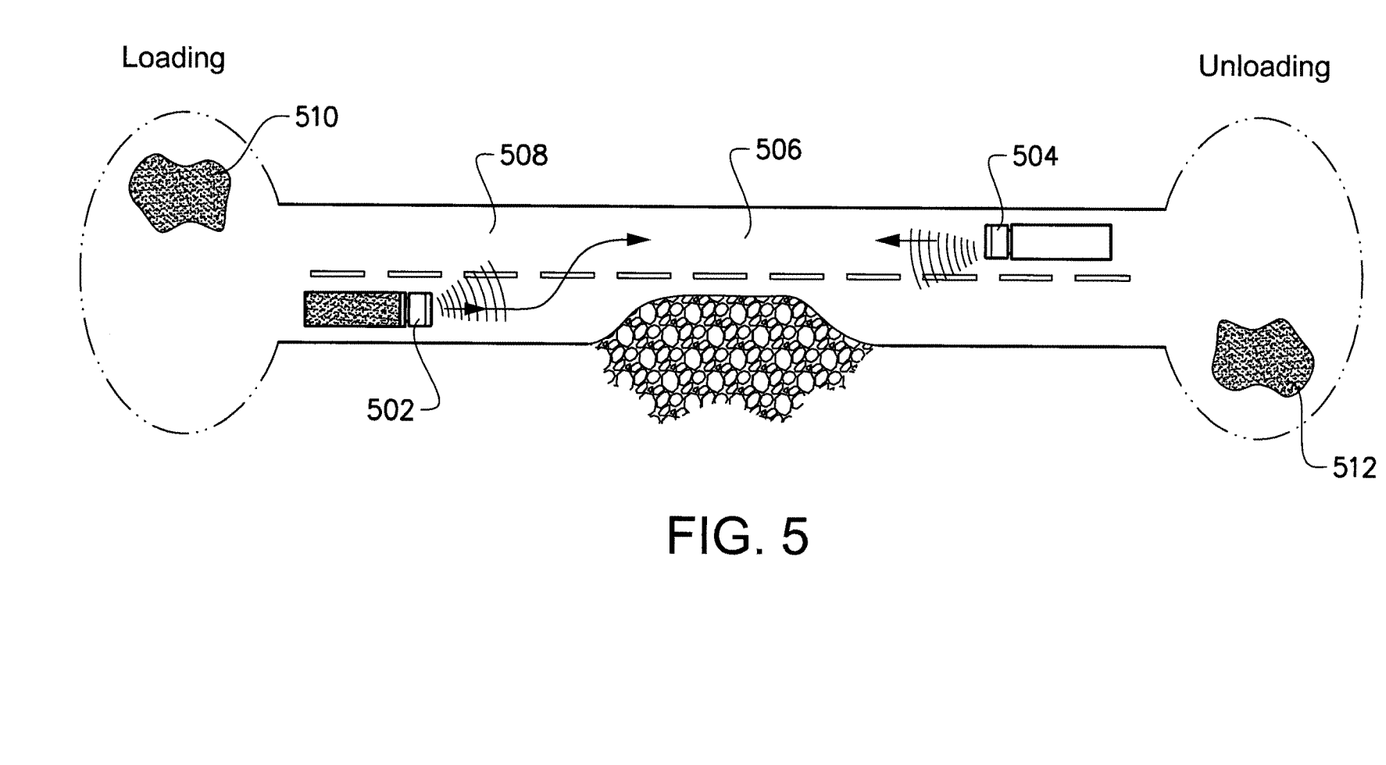
FIG. 5 shows a top view of a driving scenario where two vehicles approach a bottle neck of a road.

In order to further describe the functionality of the present invention, reference is now made to FIGS. 3-5. The vehicles depicted and described in relation to the system and FIGS. 3-5 will be numbered first vehicle, second vehicle, third vehicle, etc, in order to simplify the description. Furthermore, reference to the system and device described above will be the same irrespective of which vehicle it is mounted to, since the following examples assumes that all vehicles at the respective working: site is provided, with the above described system 200.

Firstly, reference is made to FIG. 3, which illustrates an example of a driving scenario at a working site having a loading position 302 and an unloading position 304. Vehicles working at the working site depicted in FIG. 3 are hence arranged to load the container 5 of the vehicle at the loading position 302 and drive to the unloading position 304 where the vehicle empties the container 5. The dashed arrows are configured to depict the driving path of the respective vehicles.

The working site depicted in FIG. 3 comprises a first vehicle 306 being provided with a load 305 at the loading position 302, and a second vehicle 308 already provided with a load 305 and being on its way towards the unloading position 304. The second vehicle 308 is hence driving in front of the first vehicle 306. Furthermore, a third vehicle 310 is currently unloading its container 5 at the unloading position 304 and a fourth vehicle 312, having an empty container 5, is on its way towards the loading position 302.

Now, when the second vehicle 308 is driving towards the unloading position 304, the transmitter 204 of the device 202 mounted to the second vehicle 308 transmits an estimated time of arrival 314 at the unloading position 304, which is the next stop for the second vehicle 308. The estimated time of arrival at the unloading position 304 for the second vehicle 308 is received by the respective first 306, third 310, and fourth 312 vehicles at the working site. Depending on which direction the respective vehicle is currently heading, the device can either use the received information, or determine to neglect the received information. In the example depicted in FIG. 3, the next target destination for the third 310 and fourth 312 vehicles are the loading position 302, which is not the same target destination as the target destination for the second vehicle 308. Therefore, the device arranged in the third. 310 and the fourth 312 vehicle can chose to neglect the received estimated time of arrival 314 for the second vehicle 308 since the estimated time of arrival at the unloading position 304 will not affect the desired estimated time of arrival at the loading position 302 for the third 310 and the fourth 312 vehicle. The following will hence focus on the relation between the first 306 and the second 308 vehicles at the working site.

As described, the transmitter 204 of the device 202 mounted to the second vehicle 308 has transmitted an estimated time of arrival 314 at the unloading position 304, which estimated time of arrival 314 has been received by the receiver 206 of the device 202 mounted to the first vehicle 306. Since the next target destination for the first vehicle 306 is the same as the next target destination for the second vehicle 308, i.e., the unloading position 304 the device 204 mounted to the first vehicle 306 will use the received estimated time of arrival for the second vehicle 308 to calculate a desired estimated time of arrival at the unloading position for the first vehicle 306.

Now, the device 202 mounted to the first vehicle 306 calculates a desired estimated time of arrival based on the received estimated time of arrival for the second vehicle 308, as well as calculating a desired vehicle speed in order to arrive at the target destination at the calculated desired estimated time of arrival. The transmitter 204 of the device 202 mounted to the first vehicle can thereafter transmit this calculated estimated time of arrival, as well as its current vehicle speed and its calculated desired vehicle speed, to other vehicles at the working site for them to use in a corresponding manner.

If it is determined that the first vehicle 306, if keeping its current speed, will arrive at the unloading position 304 to close in time after the second vehicle 308, the device 202 of the first vehicle 306 can thus calculate that the first vehicle 306 should slow down instead of having to wait in line at the unloading position 304, which will reduce the fuel consumption of the first vehicle 306.

Although the description in relation to FIG. 3 mainly have focused on the device 202 mounted to the second vehicle 308 transmitting its estimated time of arrival at the unloading position 304 for the second vehicle 308, it should be readily understood that also the device 202 mounted to the third 310 and the fourth 312 vehicle transmits the estimated time of arrival at the loading position for the respective third 310 and fourth 312 vehicles.

Turning now to FIG. 4, which illustrates a further example of a driving scenario at a working site having a first 402 and a second 404 loading position, and a first 406 and a second 408 unloading position. A first vehicle 410 and a second vehicle 412 is leaving the second loading position 404 and are on their way towards one of the unloading positions 406, 408, and a third vehicle 414 is leaving the first unloading position 406 and is on its way towards one of the loading positions 402, 404. The respective device 202 of the first 410, second 412 and third 414 vehicles transmits and receives estimated time of arrival, as described above.

The main difference between the example depicted in FIG. 3 and the example depicted in FIG. 4 is that the devices 202 mounted to the first 410 and the second 412 vehicle in FIG. 4 are further configured to select which one of the respective loading positions 402, 404 or unloading positions 406, 408 the respective vehicle should arrive at, in dependence of the received estimated time of arrival from other surrounding vehicles. Also, since the first 410 and the second 412 vehicles are heading towards one of the unloading positions 406, 408, and the third vehicle is heading towards one of the loading positions 402, 404, the following description will focus on the relation between the first 410 and the second vehicle 412 for the same reasons as described above in relation to FIG. 3.

As an example, the second vehicle 412 is heading towards the first unloading position 406. When the first vehicle 410 thereafter leaves the second loading position 404, the receiver 206 of the device 202 mounted to the first vehicle 410 receives an estimated time of arrival at the first unloading position 406 for the second vehicle 412. The device 202 mounted to the first vehicle 410 then, as described above, calculates a desired estimated time of arrival at the first unloading position 406 and a target vehicle speed. However, if it, for example, turns out that the distance between the first vehicle 410 and the second vehicle 412 is such that the first vehicle 410 will have to wait at the first unloading position 406 irrespective of how much it reduces its vehicle speed, the device 202 may be configured to direct the first vehicle 410 to drive to the second unloading position 408 instead of the first unloading position 406. Hereby, the overall working capacity of the working site may be increased.

Reference is now made to FIG. 5 which shows a top view of a driving scenario where a first 502 and a second 504 vehicle approach a bottle neck 506 of a road 508. The first vehicle 502 has just left a loading position 510 where its container 5 has been filled up with a load. The second vehicle 504 on the other hand has just emptied the load of its container 5 at an unloading position 512 and is heading towards the loading position 510 to receive a new load. A bottle neck 506 is provided between the loading position 510 and the unloading position 512, wherein the first 502 and the second 504 vehicle is unable to meet since the width of the road at this position is not wide enough for housing two vehicles. Accordingly, if the two vehicles 502, 504 arrive at the bottle neck at approximately the same time, one of the vehicles will have to stop and wait until the other vehicle has passed the bottle neck.

As described, above, the transmitter 204 of the device 202 mounted to the respective vehicles 502, 504 transmits an estimated time of arrival at a target destination, which in FIG. 5 is the bottle neck 506 of the road 508. The respective vehicles 502, 504 can thereafter calculate its desired time of arrival at the bottle neck and calculate a target vehicle speed for arriving at the bottle neck at the desired estimated time of arrival. However, when it comes to meeting points such as e.g. the illustrated bottle neck 506 in FIG. 5, other aspects than simply the estimated time of arrival at the bottle neck for the surrounding vehicles may be important when calculating a desired estimated time of arrival and target speed. The following will give a few examples of parameters that can be used when calculating the desired estimated time of arrival at the bottle neck and calculating the corresponding vehicle speed for arriving at the bottle neck at the desired time. Assumption is made that the vehicles 502, 504 will meet at the bottle neck if they continue to drive with current vehicle speed.

Firstly, if one of the vehicles is provided with a load, e.g. the container of one of the vehicle is provided with a load, than the device 202 mounted to the respective vehicles can use this information when calculating a desired estimated time of arrival at the bottle neck 506. A vehicle, here the first vehicle 502, provided with a load may have priority in relation to a vehicle 504 without a load. This means that the vehicle without a load should slow down such that the vehicle with the load can pass the bottle neck first. Hereby, the total fuel consumption of the two vehicles 502, 504 is reduced in relation to e.g. stopping the first vehicle 502 with the load and letting the vehicle 504 without load passing the bottle neck 506 first. The device 202 of the respective vehicle may receive information regarding container load by means of receiving signals from e.g. a weight unit arranged on the vehicle. The same priority rulings naturally applies to vehicles of different size, where a heavy vehicle, with or without load, may have priority over a less heavy vehicle, e.g. a heavy duty vehicle in comparison to a car.

According to another example, a vehicle going uphill may have priority over a vehicle going downhill, since this will reduce the total fuel consumption of the vehicles.

Other priority examples are of course conceivable, for example, vehicles in most need of arriving at its target destination may be prioritized over other vehicles, such that the production rate of the overall working site can be maximized. Another example may be the overall fuel consumption of the vehicles, where the vehicle affecting the overall fuel consumption the most, if having to slow down or stop, should be prioritized. Also, priority may be given to the vehicle with most risk of arriving late to its target destination. This can be calculated by means of a time span between the latest time the vehicle needs to be at a target destination and the estimated time of arrival at the target destination. Hereby, the vehicle with the shortest time span may be prioritized to e.g. maintain site productivity.

The above examples can be used separately or in combination. Also, the examples may assume that the transmitter 204 of the respective devices 202 is configured to transmit information regarding e.g. vehicle weight, current vehicle speed, target vehicle speed, etc. Some of the information does not necessarily have to be transmitted, but can instead be provided to the respective device by means of e.g. a GPS. Such information may relate to the topographic conditions of the road, etc.

Furthermore, although the description in relation to FIG. 5 mainly has been focused on one of the vehicles slowing down, or even stops and wait for the other vehicle, it may of course also be decided that one of the vehicles should increase its speed in order to pass the bottle neck before the other vehicle arrives at the bottle neck. Also, the embodiment in FIG. 5 is not limited to the described bottle neck 506, which mainly serves for illustrative purposes of describing passages in which it is difficult, or impossible, for two vehicles to meet. The bottle neck 506 can hence also include other road limitations, such as e.g. sharp curves, a narrow area of a road segment, a road crossing, etc.

Figure 6:
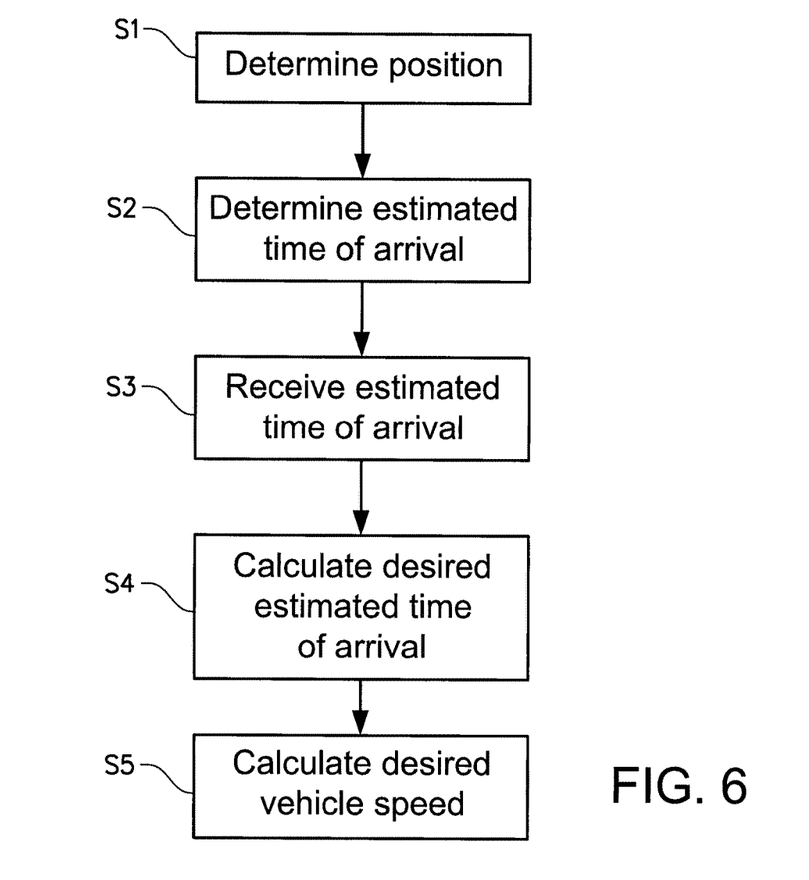
FIG. 6 shows a flow chart of a method according to an example embodiment of the present invention.

Reference is finally made to FIG. 6 in combination with FIG. 3 for describing a method according to the present invention and to summarize the above description.

For calculating the desired time of arrival at the target destination 304 of the first vehicle 306, the first step of the method is to determine S1 a current position of the first vehicle 306. Thereafter, the estimated time of arrival at the target destination 304 for the first vehicle 306 is determined S2. This is achieved by means of predetermined route data, the determined position of the first vehicle 306 and the target destination.

The device 202 mounted to the first vehicle 306 thereafter receives S3, from a second vehicle 308, an estimated time of arrival at the target destination 304 for the second vehicle 308. Based on the received estimated time of arrival at the target destination 304 for the second vehicle 308, the logic unit 208, or the device 202, calculates S4 a desired estimated time of arrival at the target destination 304 for the first vehicle 306. Hereby, the desired estimated time of arrival at the target destination 304 can be calculated in such a way that the first vehicle 306 does not have to stand still and wait at the target destination 304.

Finally, a desired vehicle speed is calculated 55 for the first vehicle 306 for achieving the desired estimated time of arrival at the target destination 304.

It should be readily understood that the method described above in relation to FIG. 6 may further implement any of the other features described above in relation to FIGS. 1-5.

Although the system has been described mainly for use at a working site, the present invention is naturally applicable for other purposes as well, such as e.g. terminals where two or more wheel loaders moves material to/from a container or the like. Accordingly, the present invention is not limited to the use of the illustrated articulated hauler but can hence also be used for an sort of vehicle such as e.g. wheel loaders, trucks, dumpers, etc. Also, although not depicted, the unloading positions may be e.g. a crusher or other material handling systems that are configured to more or less immediately handle the loads received by the respective vehicles.

Furthermore, the system (200) does not necessarily have to be positioned at the location of the vehicle as illustrated in FIG. 1. The system may, for example, be positioned closer to the roof of the vehicle or close to an antenna of the vehicle. Also, the positioning of the system is naturally dependent on the vehicle it is provided to, which may be different from vehicle to vehicle.

The invention claimed is:

1. A system for calculating a desired time of arrival to a target destination of a working site for a working machine, comprising a device mountable to a first vehicle being a working machine, the device comprises:
    a transmitter;
    a receiver; and
    a logic unit configured to receive signals for determining a current position and a current vehicle speed of the first vehicle, the logic unit being further configured to determine an estimated time of arrival at a target destination for the first vehicle based on predetermined route information, the current position of the first vehicle and the target destination of the first vehicle;
  characterized in that the device is configured to:
    transmit the estimated time of arrival at the target destination for the first vehicle;
    receive, from a second vehicle being a working machine, an estimated time of arrival at the target destination for the second vehicle;
    calculate a desired estimated time of arrival at the target destination for the first vehicle based on the received estimated time of arrival at the target destination for the second vehicle; and
    calculate a desired vehicle speed for the first vehicle for achieving the desired estimated time of arrival at the target destination for the first vehicle,
  wherein the device is further configured to:

receive signals indicative of a weight of a load on a platform of the respective first and the second vehicle, and calculate a desired estimated time of arrival at the target destination for the first vehicle based on the received estimated time of arrival at the target destination for the second vehicle and a weight ratio between the weight of the load on the platform of the first vehicle and the weight of the load on the platform of the second vehicle.

2. The system according to claim 1, wherein the device is further configured to:

receive an estimated time of arrival at the target destination for a third vehicle being a working machine;

calculate a desired estimated time of arrival at the target destination for the first vehicle based on the received estimated time of arrival at the target destination for the third vehicle; and calculate a desired vehicle speed for the first vehicle for achieving the desired estimated time of arrival at the target destination for the first vehicle only if the estimated time of arrival at the target destination for the third vehicle is later than the estimated time of arrival at the target destination for the second vehicle.

3. The system according to claim 1, wherein the device is further configured to:

receive an estimated time of arrival at a second target destination for a third vehicle being a working machine; and calculate a desired estimated time of arrival at the second target destination for the first vehicle based on the received estimated time of arrival at the second target destination for the third vehicle only if the second target destination is the same target destination as the target destination.

4. The system according to claim 1, wherein the target destination is a first target destination, wherein the device is further configured to:

determine an estimated time of arrival at a second target destination for the first vehicle, and select that a next desired target destination for the first vehicle is the first target destination if the determined estimated time of arrival at the first target destination is earlier in time than the determined estimated time of arrival at the second target destination.

5. The system according to claim 1, wherein the device is further configured to:

receive signals, from weight sensors of the vehicle, indicative of a current weight of a load on a platform of the vehicle; and select that a next desired target destination for the first vehicle is a second target destination if the weight of the load on the platform of the first vehicle is above a predetermined weight value.

6. The system according to claim 1, wherein the device is further configured to:

determine an estimated time of arrival at a second target destination for the first vehicle; and select that a desired target destination for the first vehicle is the second target destination if a time difference between the estimated time of arrival at a first target destination for the first vehicle and the estimated time of arrival at the first target destination for the second vehicle is below a predetermined time period.

7. The system according to claim 1, wherein the target destination is selected based on the route information and the current position.

8. The system according to claim 1, wherein the device is further configured to:

receive a signal indicative of a current vehicle speed of the first vehicle;

receive a signal indicative of a current vehicle speed of the second vehicle; and calculate a desired estimated time of arrival at the target destination for the first vehicle based on the received estimated time of arrival at the target destination for the second vehicle and a vehicle speed ratio between the vehicle speed of the first vehicle and the vehicle speed of the second vehicle.

9. The system according to claim 1, wherein the device is further configured to:

transmit a signal to a display unit arranged within a compartment of the first vehicle, wherein the signal is indicative of the calculated vehicle speed of the first vehicle.

10. The system according to claim 1, wherein the device is further configured to:

transmit a signal to a driveline of the first vehicle, wherein the signal is indicative of the calculated vehicle speed of the first vehicle for controlling the speed of the driveline of the first vehicle.

11. The system according to claim 1, wherein the calculated desired vehicle speed of the first vehicle is based on the estimated time of arrival received from the second vehicle and a predetermined time period.

12. The system according to claim 11, wherein the predetermined time period is a part of the time period the second vehicle is expected to be stationary at the target destination.

13. The system according to claim 1, wherein the device is further configured to:

receive a signal from the target destination, the signal being indicative of an estimated duration of stay for the second vehicle at the target destination.

14. The system according to claim 1, wherein the signals received by the logic unit for determining a current position of the first vehicle are provided from a global positioning unit.

15. The system according to claim 1, wherein the signals received by the logic unit for determining a current vehicle speed of the first vehicle are provided from a global positioning unit or a speedometer.

16. A system for calculating a desired time of arrival to a target destination of a working site for a working machine, comprising a first and a second device mountable to a respective first and second vehicle, the first and the second vehicle each being working machines, each of the first and the second devices comprising:

a transmitter;

a receiver; and a logic unit configured to receive signals for determining a current position and a current vehicle speed for the respective first and the second vehicle, the logic unit being further configured to determine an estimated time of arrival at a target destination based on predetermined route information, the current position and the target destination for the respective first and second vehicles, wherein the second device is configured to transmit the estimated time of arrival at the target destination for the second vehicle, wherein the first device is configured to receive the transmitted estimated time of arrival at the target destination for the second vehicle and to calculate a desired estimated time of arrival at the target destination for the first vehicle based on the received estimated time of arrival at the target destination for the second vehicle, and to calculate a desired vehicle speed for the first vehicle for achieving the desired estimated time of arrival at the target destination for the first vehicle, wherein the logic unit is further configured to:

receive signals indicative of a weight of a load on a platform of the respective first and the second vehicle, and calculate a desired estimated time of arrival at the target destination for the first vehicle based on the received estimated time of arrival at the target destination for the second vehicle and a weight ratio between the weight of the load on the platform of the first vehicle and the weight of the load on the platform of the second vehicle.

17. The system according to claim 16, comprising a plurality of devices mountable to respective plurality of vehicles being working machines, wherein a first subset of the plurality of vehicles has a first target destination, and a second subset of the plurality of vehicles has a second target destination;

wherein each device is configured to calculate a desired vehicle speed only when receiving an estimated time of arrival from a device of a vehicle having the same target destination.

18. A method for calculating a desired time of arrival to a target destination of a working site for a first vehicle being a working machine, the first vehicle comprising a transmitter, a receiver and a logic unit, the method comprising the steps of:

determining a current position of the first vehicle;

determining an estimated time of arrival at the target destination for the first vehicle based on predetermined route Information, the current position and the target destination of the first vehicle;

receiving, from a second vehicle being a working machine, an estimated time of arrival at the target destination for the second vehicle;

calculating, by means of the logic unit, a desired estimated time of arrival at the target destination for the first vehicle based on the received estimated time of arrival at the target destination for the second vehicle; and calculating a desired vehicle speed for the first vehicle for achieving the desired estimated time of arrival at the target destination for the first vehicle, receiving signals indicative of a weight of a load on a platform of the respective first and the second vehicle, and calculating a desired estimated time of arrival at the target destination for the first vehicle based on the received estimated time of arrival at the target destination for the second vehicle and a weight ratio between the weight of the load on the platform of the first vehicle and the weight of the load on the platform of the second vehicle.

19. A computer comprising a program for performing, when the program is run on the computer, a method for calculating a desired time of arrival to a target destination of a working site for a first vehicle being a working machine, the first vehicle comprising a transmitter, a receiver and a logic unit linked to the computer, the method comprising the steps of:

determining a current position of the first vehicle;

determining an estimated time of arrival at the target destination for the first vehicle based on predetermined route Information, the current position and the target destination of the first vehicle;

receiving, from a second vehicle being a working machine, an estimated time of arrival at the target destination for the second vehicle;

calculating, by means of the logic unit, a desired estimated time of arrival at the target destination for the first vehicle based on the received estimated time of arrival at the target destination for the second vehicle; and calculating a desired vehicle speed for the first vehicle for achieving the desired estimated time of arrival at the target destination for the first vehicle, receiving signals indicative of a weight of a load on a platform of the respective first and the second vehicle, and calculating a desired estimated time of arrival at the target destination for the first vehicle based on the received estimated time of arrival at the target destination for the second vehicle and a weight ratio between the weight of the load on the platform of the first vehicle and the weight of the load on the platform of the second vehicle.

20. A non-transitory computer readable medium comprising a computer program for performing, when the program is run on a computer, a method for calculating a desired time of arrival to a target destination of a working site for a first vehicle being a working machine, the first vehicle comprising a transmitter, a receiver and a logic unit, the method comprising the steps of:

determining a current position of the first vehicle;

determining an estimated time of arrival at the target destination for the first vehicle based on predetermined route Information, the current position and the target destination of the first vehicle;

receiving, from a second vehicle being a working machine, an estimated time of arrival at the target destination for the second vehicle;

calculating, by means of the logic unit, a desired estimated time of arrival at the target destination for the first vehicle based on the received estimated time of arrival at the target destination for the second vehicle; and calculating a desired vehicle speed for the first vehicle for achieving the desired estimated time of arrival at the target destination for the first vehicle, receiving signals indicative of a weight of a load on a platform of the respective first and the second vehicle, and calculating a desired estimated time of arrival at the target destination for the first vehicle based on the received estimated time of arrival at the target destination for the second vehicle and a weight ratio between the weight of the load on the platform of the first vehicle and the weight of the load on the platform of the second vehicle.

* * * * *